(12) United States Patent
Xu

(10) Patent No.: US 12,105,615 B2
(45) Date of Patent: Oct. 1, 2024

(54) WEBPAGE COMPONENT TRACKER

(71) Applicant: International Business Machines Corporation, Armonk, NY (US)

(72) Inventor: Chun Lei Xu, Xian (CN)

(73) Assignee: International Business Machines Corporation, Armonk, NY (US)

( * ) Notice: Subject to any disclaimer, the term of this patent is extended or adjusted under 35 U.S.C. 154(b) by 23 days.

(21) Appl. No.: 17/447,699

(22) Filed: Sep. 15, 2021

(65) Prior Publication Data
US 2023/0079484 A1    Mar. 16, 2023

(51) Int. Cl.
*G06F 8/38*       (2018.01)
*G06F 11/36*      (2006.01)
*G06F 16/957*     (2019.01)
*G06F 16/958*     (2019.01)

(52) U.S. Cl.
CPC ............ *G06F 11/3636* (2013.01); *G06F 8/38* (2013.01); *G06F 16/9577* (2019.01); *G06F 16/986* (2019.01)

(58) Field of Classification Search
CPC ...... G06F 16/9577; G06F 8/38; G06F 40/106; G06Q 40/02
See application file for complete search history.

(56) References Cited

U.S. PATENT DOCUMENTS

| | | | |
|---|---|---|---|
| 6,973,627 B1 * | 12/2005 | Appling | G06F 16/9577 715/781 |
| 7,890,919 B1 | 2/2011 | Williams | |
| 8,510,675 B1 * | 8/2013 | Jitkoff | G06F 3/0481 715/764 |
| 10,031,729 B1 * | 7/2018 | Totale | G06F 8/38 |
| 2012/0151442 A1 * | 6/2012 | Aslam | G06F 8/60 717/121 |
| 2017/0153883 A1 | 6/2017 | Oliver | |
| 2021/0365506 A1 * | 11/2021 | Chu | G06F 8/38 |

FOREIGN PATENT DOCUMENTS

WO    WO-2005104759 A2 *   11/2005   ............. H04L 67/02

OTHER PUBLICATIONS

"Carbon Design System", GitHub, accessed on May 19, 2021, 5 pages, <https://github.com/carbon-design-system/carbon>.
"Debugging Lightning Components with the Salesforce Lightning Inspector", Jul. 23, 2018, 10 pages, <https://saramorgan.net/2018/07/23/debugging-lightning-components-with-the-salesforce-lightning-inspector/>.
"DOM Inspector", mozillaZine, Mar. 25, 2018, 2 pages, <http://kb.mozillazine.org/DOM_Inspector#Available_documentation>.
"Use the Inspector from the Web Console", Last modified: Feb. 2, 2021, by MDN contributors. MDN Web Docs, 3 pages. <https://developer.mozilla.org/en-US/docs/Tools/Page_Inspector/How_to/Use_the_Inspector_from_the_Web_Console>.
Lahmatiy, "Component inspector". Mar. 3, 2018, 13 pages, <https://github.com/lahmatiy/component-inspector>.

* cited by examiner

*Primary Examiner* — Ziaul A Chowdhury
(74) *Attorney, Agent, or Firm* — Tihon Poltavets

(57) ABSTRACT

A method, computer program product and computer system to track and test custom webpage components is provided. A processor retrieves a production webpage. A processor determines a custom component of the production webpage. A processor retrieves component metadata associated with the custom component. A processor generates a hidden element in the production webpage including the component metadata, wherein the production webpage is configured to make the hidden element visible in response to an event.

17 Claims, 6 Drawing Sheets

WEBPAGE COMPONENT TRACKER

BACKGROUND OF THE INVENTION

The present invention relates generally to the field of webpage development, and more particularly to tracking components of a webpage in a production environment.

Webpage development is the practice of developing a web site for users to access. For larger projects, webpage development requires numerous hundreds of people, such as developers, designers, and graphic artists, to collaborate in order to develop a website. Each page of a website is comprised of various components or parts that provide an interactive interface to a user when visiting said website, such as HTML (hypertext markup language) elements like input fields, media sources, or even code or scripts. Testing of the user interaction with the various components must be performed to ensure proper operation of the website prior to deployment.

SUMMARY

Embodiments of the present invention provide a method, system, and program product to track and test custom webpage components. A processor retrieves a production webpage. A processor determines a custom component of the production webpage. A processor retrieves component metadata associated with the custom component. A processor generates a hidden element in the production webpage including the component metadata, wherein the production webpage is configured to make the hidden element visible in response to an event.

DETAILED DESCRIPTION

Figure 1:
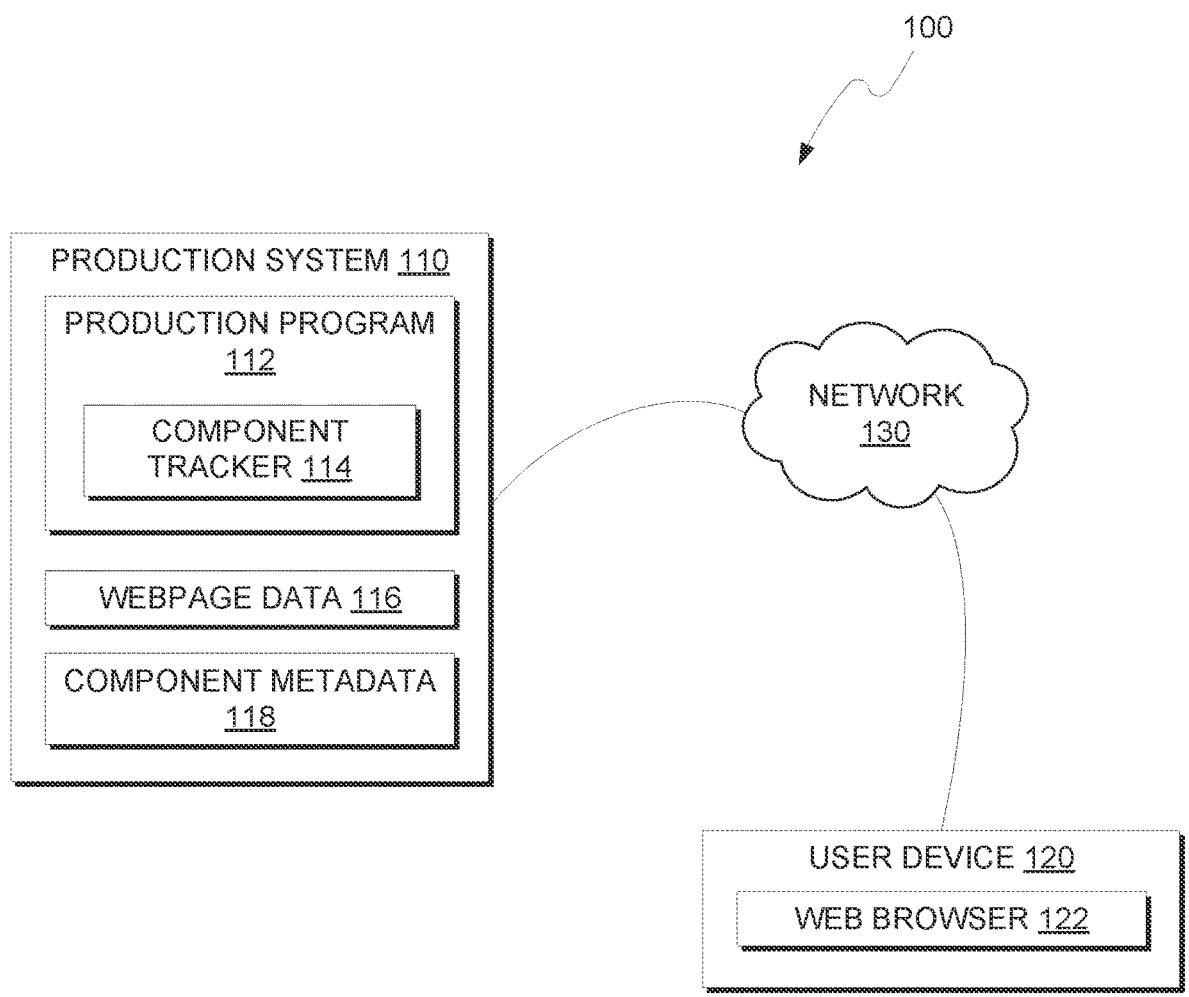
FIG. 1 is a functional block diagram illustrating a production environment, in accordance with an exemplary embodiment of the present invention.

For large scale platforms, webpage development relies upon constructing components using preexisting packages, such as node package manager (NPM). While a webpage, when rendered, provides the components to a user via a document object model (DOM) tree, the DOM tree only provides a layout of the components (e.g., the "front-end" of a webpage) and not the interdependencies of the underlying code, scripts and other interactive elements of the webpage (e.g., the "back-end" of a webpage). Embodiments of the present invention recognize that by tracking and automatically updating the HTML of a webpage during development a production environment can be provided to developers and testers that provides an interactive interface within the webpage to track and identify various metadata regarding each component, such as repository location, code and library dependencies, and the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 is a functional block diagram illustrating production environment, generally designated 100, in accordance with one embodiment of the present invention. Production environment 100 includes production system 110 and user device 120 connected over network 130. Production system 110 includes production program 112, component tracker 114, webpage data 116 and component metadata 118. User device 120 includes web browser 122.

In various embodiments of the present invention, production system 110 and user device 120 are both computing devices that can be a standalone device, a server, a laptop computer, a tablet computer, a netbook computer, a personal computer (PC), or a desktop computer. In another embodiment, production system 110 or user device 120 each represent a computing system utilizing clustered computers and components to act as a single pool of seamless resources. In general, production system 110 or user device 120 can be any computing device or a combination of devices with access to component tracker 114, webpage data 116 and component metadata 118 and is capable of executing production program 112 and web browser 122. Production system 110 or user device 120 may include internal and external hardware components, as depicted and described in further detail with respect to FIG. 6.

In this exemplary embodiment, production program 112, component tracker 114, webpage data 116 and component metadata 118 are stored on production system 110; and web browser 122 is stored on user device 120. However, in other embodiments, production program 112, component tracker 114, webpage data 116, component metadata 118 and web browser 122 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between production system 110 and user device 120, in accordance with a desired embodiment of the present invention.

In various embodiments, production system 110 provides a webpage development environment that programmers, developers, graphic designers and other contributors interact with to create and test webpages prior to being deployed for access by a public or private group. Production program 112 provides various features to permit web developers to coordinate and collaborate on the deployment of a webpage, website, or any other web-based application or platform. For example, production program 112 includes features and modules to provide both front-end development (e.g., HTML, Cascading Style Sheet (CSS), etc.) and back-end development (e.g., scripts and code such as Java, JavaScript, NodeJS, PHP, Python, etc.) of a website. While the following will be discussed in regard to developing a single webpage, one of ordinary skill in the art of web development will understand that embodiments of the invention can be applied to larger projects and platforms. Additionally, while the following will be discussed in regard to web development, one of ordinary skill in the art of web development will understand that aspects of various embodiments of the invention can be applied to other types of software development, such as for containerized applications which utilize HTML and other front-end scripts to design user interfaces, even if the application itself is not a "website", per se.

In various embodiments, production program 112 generates webpage data 116 based on the various designs, pieces of code or scripts, and requirements of the the webpage being designed. Webpage data 116 includes the underlying HTML and scripts utilized to render the webpage in a browser, such as web browser 122 of user device 120. During development of the webpage, production program 112 collects or retrieves component metadata 118 that, as discussed herein, provides information regarding each component used in webpage data 116 for the webpage being designed, which provides mechanisms to identify and troubleshoot the various components of the webpage. Example component metadata 118 includes, but is not limited to, a component name, a version number, a description of the component, dependencies to other components on the webpage, a repository location for the component, component author information, and information regarding the developer who deployed, wrote, or otherwise added the component to the webpage during development.

In various embodiments, various users, such as developers and testers, view and test the webpage as it undergoes development. Web browser 122 includes a web browser that can retrieve webpage data 116 from production system 110, which would provide the latest version, or in some instance previous versions, of the webpage being developed. Web browser 122 operates as a web browser, rendering the retrieved webpage from webpage data 116 based on the underlying HTML, and scripts. As discussed herein, production program 112 automatically adds indications of component metadata 118 to each component of the webpage during development. Additionally, production program 112 configures webpage data 116 to display the component metadata 118 associated with each component based on a user interaction or other event captured by web browser 122. When a user of web browser 122 triggers an event associated with a component, webpage data 116 includes changes made by production program 112 to display the component metadata 118 associated with the component associated with the trigger event. Example trigger events include, but are not limited to, mouseover, hover or click events with a component of the webpage received by web browser 122. In some scenarios, production program 112 alters webpage data 116 to include a separate component, that is part of webpage data 116, that display component metadata 118 associated with the components of the webpage, the last interacted component, or those currently being rendered by web browser 122.

In various embodiments, production program 112 receives input from users to generate the HTML and scripts, collecting and storing the input in webpage data 116. When supplied to a web browser, such as web browser 122, the HTML and scripting in webpage data 116 instructs the web browser on how to render the webpage. During this process web browsers generate a document object model (DOM) which is a hierarchical mapping of the various components in the rendered webpage, represented as nodes. Each subsequent node in the hierarchical DOM tree represents components of the webpage that are grouped together based on the design of the webpage. For example, a <body>HTML tag contains a <h1>HTML tag or heading level 1 tag nested within the <body>tag. In this example, the <h1>node would be a branch of the <body>node in a DOM tree.

Embodiments of the present invention recognize that the DOM tree only represents the visual layout of a webpage and does not take into account the other interactions of the other components being displayed in a web browser. For example, scripts, code and other webpage components that are used in a webpage are not represented in a DOM tree and therefore are difficult to determine any dependencies and interactions between scripts, code or other packages on a webpage. Embodiments of the present invention provide mechanisms for tracking and identifying these portions of the webpage to enable for better testing and troubleshooting of the webpage during design. Additionally, embodiments of the present invention provide mechanisms to display relevant component metadata information to further improve the testing and troubleshooting of the webpage during design.

Figure 4:
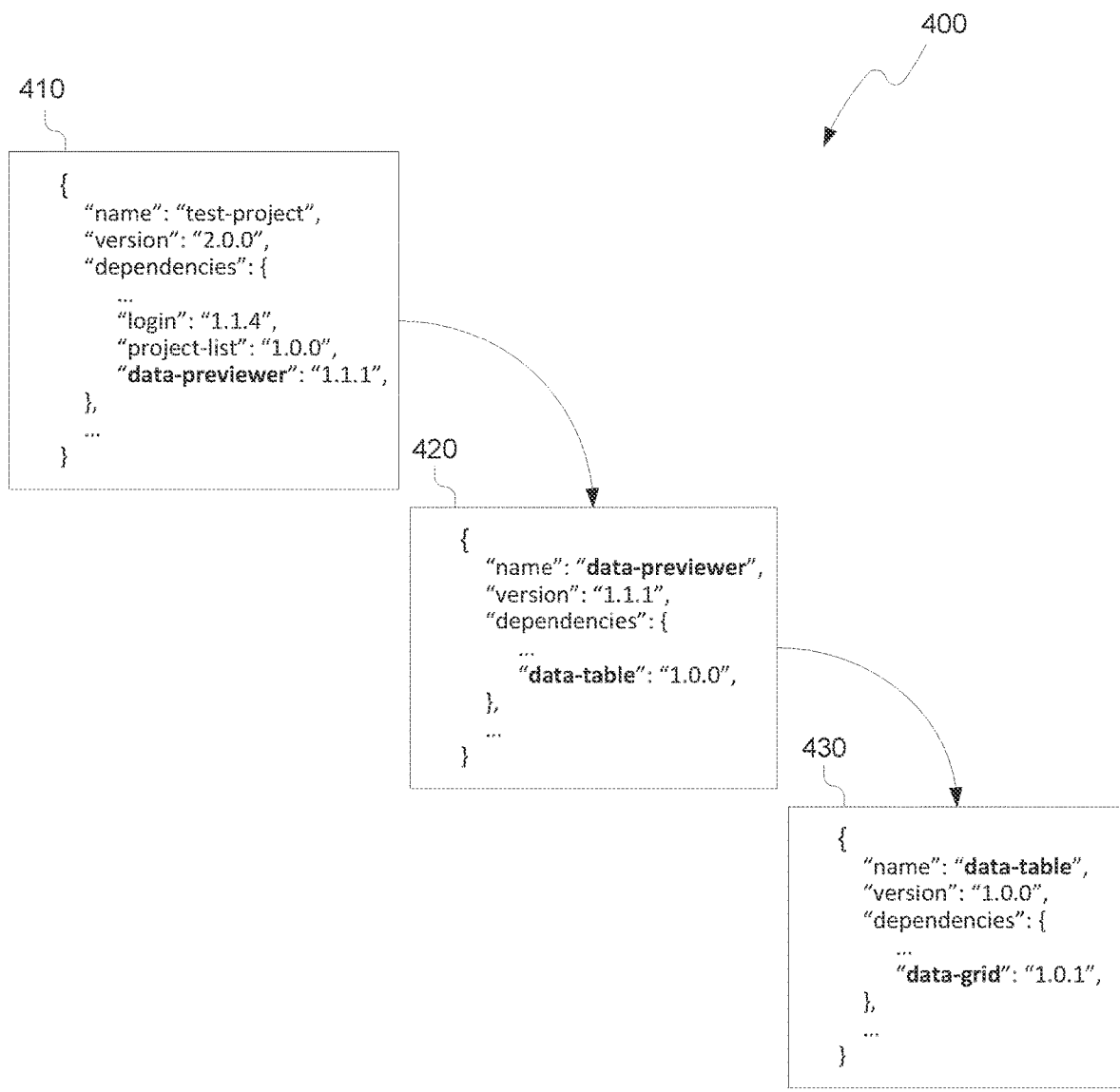
FIG. 4 illustrates three example components of an example webpage that are parts of a package manifest for a webpage.

Looking now to FIG. 4, packages 400 illustrates three example components 410, 420 and 430 of an example webpage data 116 that are parts of a package manifest for a webpage, such as a JavaScript Object Notation (JSON) package. In this example, component 410 is a top-level node for the webpage, which contains a "data-previewer" component that provides a preview on mouseover of a data table. Component 420 is the portion of the package manifest related to the data-previewer portion of the webpage, which constructs the table for a preview. Component 420 also includes a dependency to another component 430 "data-grid", which retrieves the data from a database to populate the table being previewed. As one of ordinary skill in the art will understand, the package manifest can be used to identify the dependencies and among components on a webpage, the place or location of the components within a rendered webpage is not obtainable via a package manifest and resulting DOM tree. That aspect lies within the underlying HTML for a webpage, which dictates the location, layout and other visual aspects of the webpage.

Returning to FIG. 1, in some embodiments, production program 112 tracks each component added to a webpage during development via component tracker 114. When a developer or other user adds a component to a webpage, component tracker 114 retrieves metadata associated with the component for display during testing, as discussed herein. In other embodiments, component tracker 114 analyzes webpage data 116 to determine which components have been added to webpage data 116. In some scenarios, developers may provide component tracker 114 updated webpage data 116 during development, were the developers added one or more new component to a webpage during production. In other scenarios, production program 112 identifies that webpage data 116 has been altered and instructs component tracker 114 to analyze webpage data 116 to determine which components have been added. As discussed herein, components are any custom elements of a webpage. While HTML and other markup languages provide flexibility in arranging and rendering objects in a web browser, but lack to depth or complexity, most webpages contain custom elements that include or otherwise point to code or scripts to create a richer webpage experience for users. An example web component may include JavaScript within the webpage to define the code for a web browser to generate and render the custom elements.

In various embodiments, component tracker 114 retrieves or monitors webpage data 116 during production of a webpage. As elements are added, component tracker 114 digests the HTML and package manifest for the webpage to identify the various custom components of the webpage. When a component is identified, component tracker 114 updates the HTML of webpage data 116 with visual elements tied to the components, with said visual elements displaying, or causing the display of, metadate related to each component. Additionally, component tracker 114 updates the HTML of webpage data 116 to include another visual element to highlight or otherwise indicate the portion of the rendered webpage each custom component occupies. Both the metadata and highlight visual elements added to the webpage are configured to be toggleable such that testers are able to visual review a webpage via web browser 122. When certain events occur, such as mouseover or other interactions such as clicking a button associated with the custom component, component tracker 114 alters the HTML, of the webpage to toggle the display of the metadata and/or page area associated with the custom component. Prior to a user interaction received via web browser 122, component tracker 114 sets these visual elements to be hidden and awaits the user to provide an interaction event to cause web browser 122 to display the metadata and highlight visual elements added to the webpage.

Figure 5:
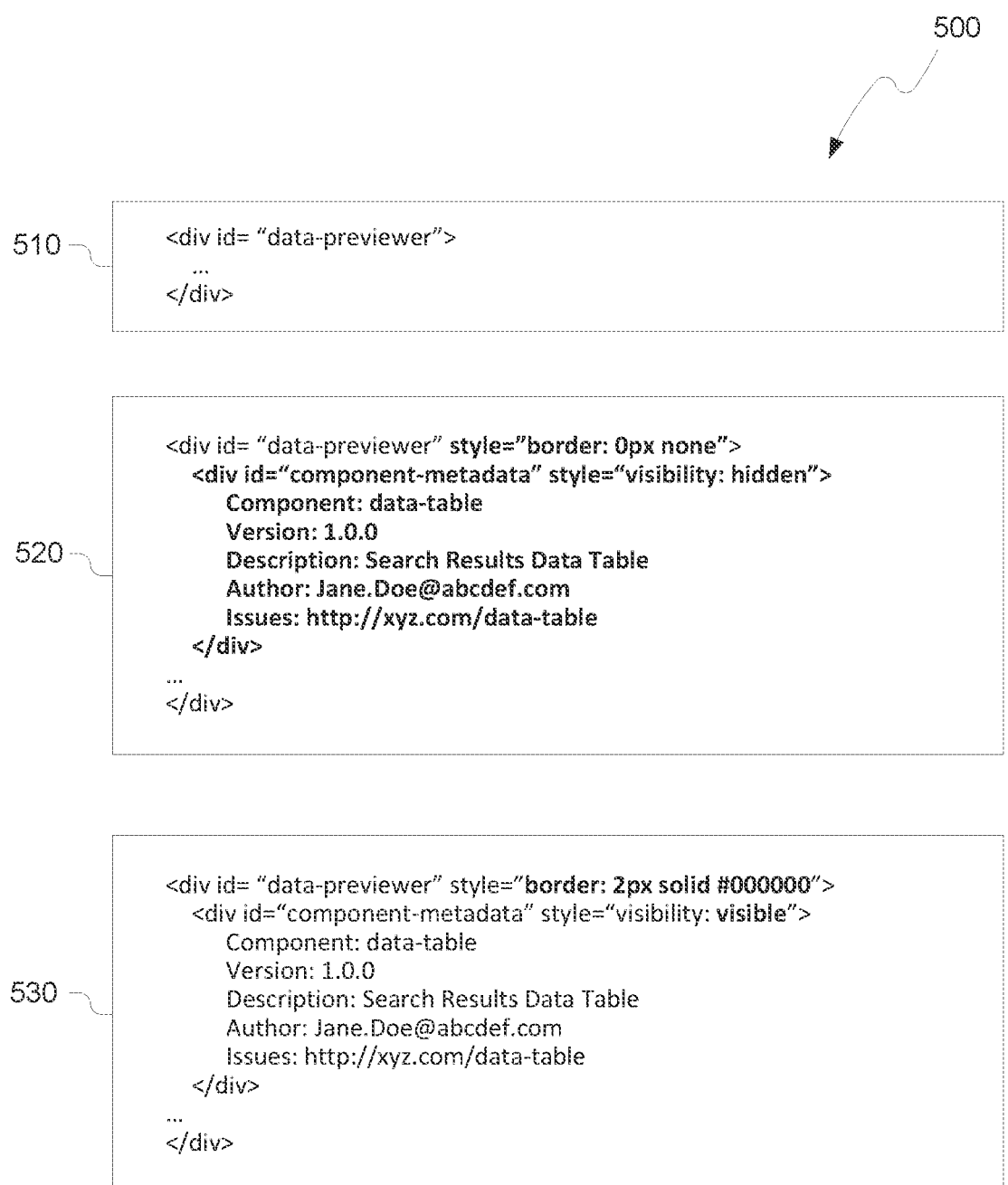
FIG. 5 illustrates a markup of a section of webpage data that is altered by a component tracker.

Looking now to FIG. 5, markup 500 includes a section of webpage data 116 that is altered by component tracker 114. In this example, a developer has added the component "data-previewer" section, or division, to a webpage in example 510. In various scenarios, component tracker 114 identifies this added component in example 510 and adds a new section (i.e., example 520) encapsulated by the section added by the developer. In this example, component tracker 114 adds a new webpage section that is initially hidden (e.g., style="visibility: hidden") and contains component metadata associated with the custom component (i.e., "data-previewer"). In this example, component metadata is passed along as text which can be formatted or arranged based on a cascading style sheet (CSS) which dictates how various part of a web page are formatted and rendered, without directly modifying each element manually. Additionally, component tracker 114 insets a border style to the portion of the webpage associated with the component that is initially hidden as well (e.g., "style=border: 0px none" sets a border style that is initially set to 0 pixels wide with no color).

In example 530, the CSS for the webpage changes based on the detection of an event received from a user. For example, as mouse-hover or mouse-over event is detected where a user of web browser 122 drags a mouse over the "data-previewer" component or hovers over said component for a predetermined amount of time. As discussed herein, when an event is detected, webpage data 116 has been altered by component tracker 114 to alter the style of the "data-previewer" border style and "component-meta" component to be visible. By inserting the border and metadata section for each component into a production webpage, testers and other users can now quickly identify and troubleshoot any issues regarding the rendering of each custom component by quickly identifying the display area of each component via the unhidden border style and the various metadata that is retrieved and is relevant to the inspected custom component. In other scenarios and embodiments, the component metadata may be presented and formatted in a variety of fashions without deviating from the invention. While CSS offers quick mechanism for formatting large portions of a webpage without manual instructions, one of ordinary skill in the art will appreciate that the formatting, display and interaction of the component metadata and display are for each custom component via custom scripting and code as well.

Returning to FIG. 1, in various embodiments, web browser 122 is a standard web browser with the ability to download and render HTML documents as well as the ability to execute, run or otherwise perform any custom code or script that is associated with the HTML documents. Embodiments of the invention do not require any plug-ins, extensions, or the like to provide the testers and developers to review the custom components of webpage data 116, as discussed herein. As such, web browser 122 can natively, without additional modification or assistance from plug-ins or extensions, permit the toggling of the visibility of component metadata and border styles. Component tracker 114 alters webpage data 116 such that the ability to highlight and/or retrieve metadata for each custom component of the webpage is part of the HTML and and corresponding styling of the webpage itself, where embodiments of the present invention provide a universal format (e.g., HTML and supporting scripts) already employed by the majority of web browsers available, that can be enabled during testing to troubleshoot and test a production webpage. In some scenarios, the component-metadata sections and border highlights discussed herein can be removed from a deployed or public webpage such that average users do not have access to any potential internal information from the development team. In other scenarios, a new CSS sheet may be generated such that the component metadata and border highlights are disabled prior to deployment to the public.

Figure 2:
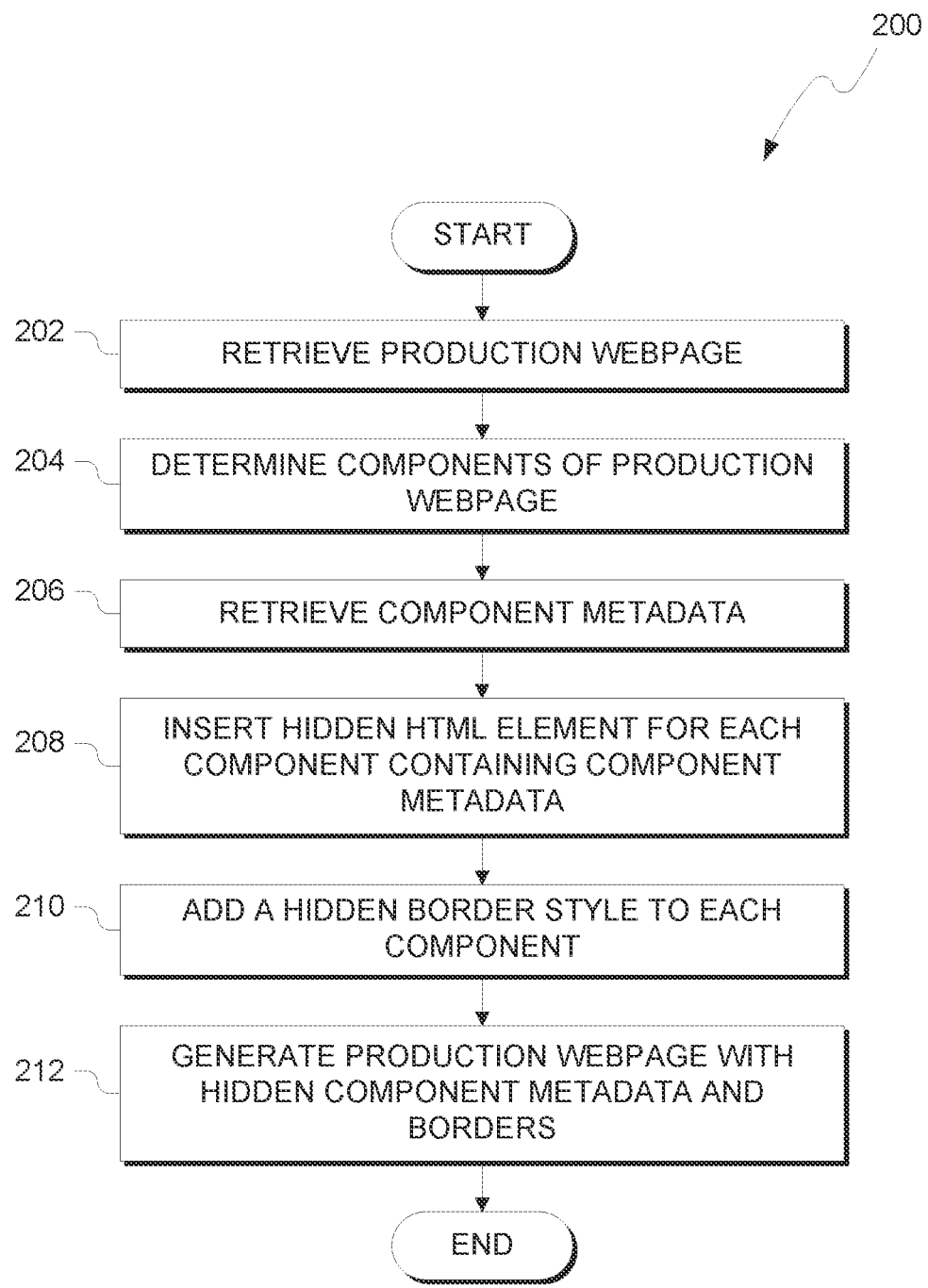
FIG. 2 illustrates operational processes of a component tracker in a production system, on a computing device within the environment of FIG. 1, in accordance with an exemplary embodiment of the present invention.

FIG. 2 illustrates operational processes, generally designated 200, of component tracker 114 on production system 110 within the environment of FIG. 1. In process 202, component tracker 114 retrieves a production webpage. A production webpage is any web page that is currently under development or is being tested. In some scenarios, a currently deployed website (i.e., available to general users) may be developed or in production in an ongoing manner (e.g., AB Testing). One of ordinary skill in the art will appreciate that a production website may apply to any testing or development of a webpage, website or web-enabled application. In some embodiments, process 202 may occur in a routine or batch manner where webpage data 116 is retrieved when a production website is ready for testing. In other embodiments, process 202 may occur as changes are being made to webpage data 116, where component tracker 114 monitors the changes to webpage data 116 to determine components of the production webpage.

In process 204, component tracker 114 determines the components of the production webpage. As discussed herein components of the production webpage correspond to any custom components that include script code or other data required to render the webpage in a browser. In process 206, component tracker 114 retrieves metadata for each component added to webpage data 116, as stored in component metadata 118 or retrieved from another source (not shown), such as a code repository. Example component metadata 118 includes, but is not limited to, a component name, a version number, a description of the component, dependencies to other components on the webpage, a repository location for the component, component author information, and information regarding the developer who deployed, wrote, or otherwise added the component to the webpage during development.

In process 208, component tracker 114 inserts a hidden HTML element for each component determined to be present in the production webpage (i.e., process 204), allowing for tracking and tracing various issues related upon the component and any depending code or scripts. For example, component tracker 114 adds the DIV element (division or section) in example 520 with the id "component-metadata". The various metadata pertaining to the type of component, component name, component author, etc. are added to the section of HTML that the component is rendered within (i.e., the DIV element with the id "data-previewer" in example 520).

In process 210, component tracker 114 inserts a hidden border style to each component in order for testers to identify the display area of the webpage in which the component is being rendering, allowing for troubleshooting of errors with rendering the component on the webpage. For example, component tracker 114 adds a border style to the section associated with the component (i.e., the style added to the "data-previewer" section in example 520).

In process 212, component tracker 114 generates production webpage data 116 with the included metadata sections and border highlights (process 208 and 210). In some scenarios and embodiments, a CSS style sheet is added (or updated if CSS is part of the production webpage already) to enable the selective display of component metadata and border highlights in a "off-the shelf" web browser, as discussed regarding FIG. 3.

Figure 3:
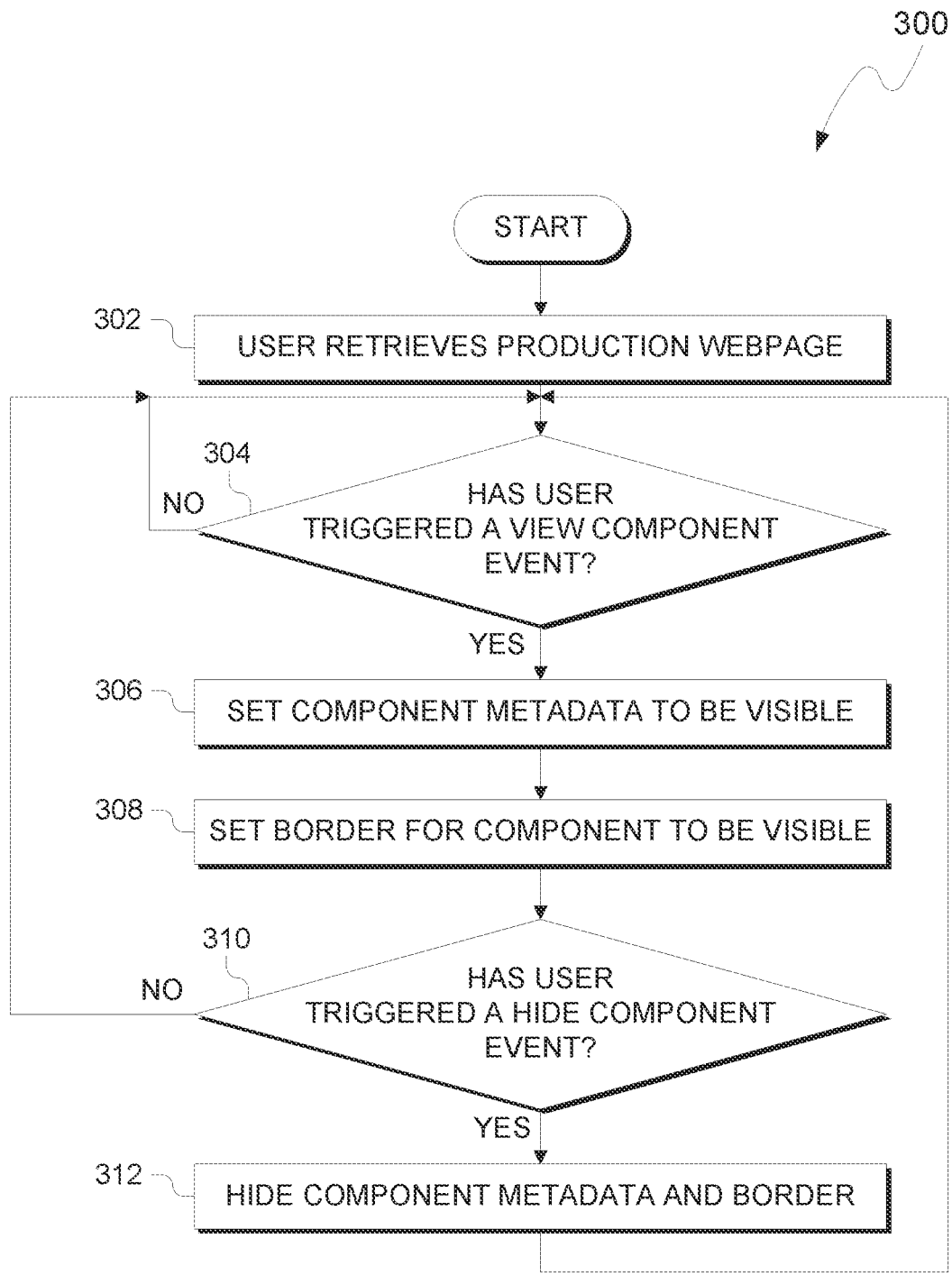
FIG. 3 illustrates operational processes of a web browser, on a computing device within the environment of FIG. 1, in accordance with an exemplary embodiment of the present invention.

FIG. 3 illustrates operational processes, generally designated 300, of web browser 122 rendering a production webpage with updated component metadata tracking as discussed in regard to FIG. 2. As previously discussed, embodiments of the present invention add component tracking and testing capabilities to a production webpage without requiring specific user program for testing. By using off-the-shelf or standard web browsers, testers are capable to test component operation as well as any rendering issues to the target browsers.

In process 302, a user instructs web browser 122 to retrieve a production webpage, such as one stored in webpage data 116. Web browser 122 retrieves and renders the webpage based on standard HTML rendering rules. During viewing of the webpage, the user may trigger one or more events that cause a component's metadata to be displayed or the component's display area to be highlighted. Example events include, but are not limited to, mouse over or mouse hover events, click events, or interacting with separate HTML elements such as a button associated with each component. In some embodiments, a toggle element is added by component tracker 114 which enables or disables component metadata and display are highlights from being visible or enabled.

In decision process 304, web browser 122 tracks various input from a user. If an event to inspect a component is provided by a user (YES branch of decision process 304), then web browser 122 sets the component metadata (process 306) and/or the highlight area (process 308) for the component to be visible or otherwise enabled. If the user does not provide an event input to view information regarding any component (NO branch of decision process 304), then web browser 122 continues to render the webpage and respond to other inputs as dictated by the production webpage. In decision process 310, web browser 122 waits for a component hide event to hide the component metadata and border (process 312). For example, if the event is a mouse over event, once a user moves the mouse input away from the display area of the component then web browser hides the component metadata and border highlight.

Figure 6:
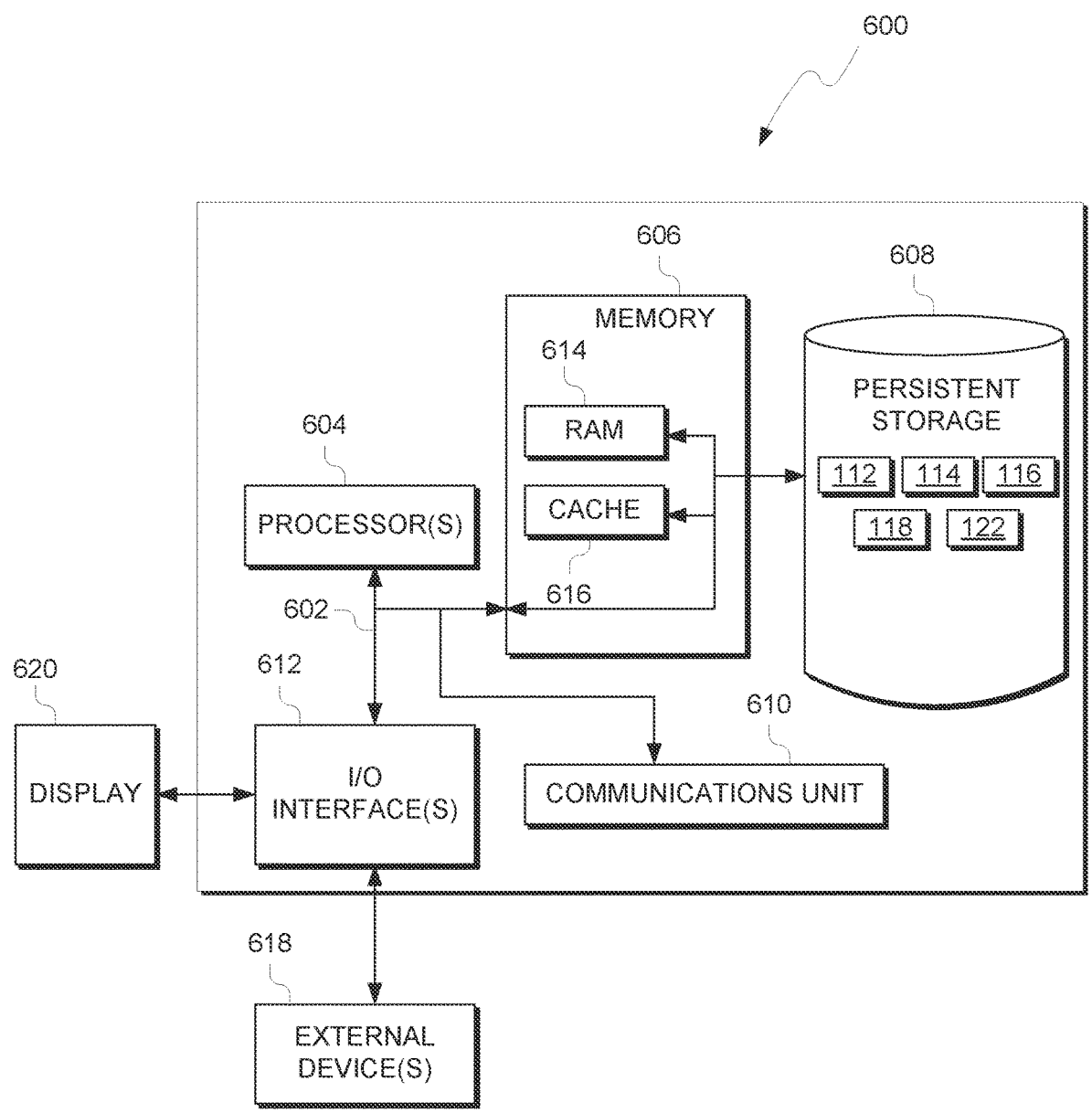
FIG. 6 depicts a block diagram of components of the computing device executing a component tracker, in accordance with an exemplary embodiment of the present invention.

FIG. 6 depicts a block diagram of components of a computing device, 600, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Production program 112, component tracker 114, webpage data 116, component metadata 118 and web browser 122 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 130. In these examples, communications unit 610 includes one or more network interface cards. Communications unit 610 may provide communications through the use of either or both physical and wireless communications links. Production program 112, component tracker 114, webpage data 116, component metadata 118 and web browser 122 may be downloaded to persistent storage 608 through communications unit 610.

I/O interface(s) 612 allows for input and output of data with other devices that may be connected to computing device 600. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., production program 112, component tracker 114, webpage data 116, component metadata 118 and web browser 122, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

What is claimed is:

1. A method comprising:
   retrieving, by one or more processors, a production webpage;
   determining, by the one or more processors, a custom component of the production webpage;
   retrieving, by the one or more processors, component metadata associated with the custom component;
   generating, by the one or more processors, a hidden element in the production webpage including the component metadata, wherein the hidden element and the component metadata is initially not visible when viewing the production webpage, and an indication for the hidden element and the component metadata is not present;
   adding, by the one or more processors, a hidden border style to the hidden element of the production webpage, wherein the production webpage is configured to make the hidden element visible in response to the event; and
   in response to an event, displaying, by the one or more processors, the hidden element and the component metadata, wherein the component metadata includes a custom component name, a version number, a description of the custom component, a repository location for the custom component, and a list of dependencies for the custom component to other custom components on the webpage.

2. The method of claim 1, wherein the component metadata further includes one or more of the following custom component author information and developer information.

3. The method of claim 1, wherein the custom component is generated based on code or script present in the production webpage.

4. The method of claim 3, wherein the custom component is determined to be present in the production webpage based on a package manifest associated with the production webpage.

5. The method of claim 1, wherein a web browser viewing the production webpage is capable of natively toggling the hidden element without a plug-in or extension.

6. The method of claim 1, wherein the event that makes the hidden element visible includes one of the following events: a mouseover event with the hidden element, a hover event with the hidden element, a click event with the hidden element, or a click event associated with a button rendered on the production webpage.

7. A computer program product comprising:
   one or more computer-readable storage media and program instructions stored on the one or more computer-readable storage media, the program instructions comprising:
   program instructions to retrieve a production webpage;
   program instructions to determine a custom component of the production webpage;
   program instructions to retrieve component metadata associated with the custom component;
   program instructions to generate a hidden element in the production webpage including the component metadata, wherein the hidden element and the component metadata is initially not visible when viewing the production webpage, and an indication for the hidden element and the component metadata is not present;
   program instructions to add a hidden border style to the hidden element of the production webpage, wherein the production webpage is configured to make the hidden element visible in response to the event; and
   program instructions, in response to an event, to display the hidden element and the component metadata, wherein the component metadata includes a custom component name, a version number, a description of the custom component, a repository location for the custom component, and a list of dependencies for the custom component to other custom components on the webpage.

8. The computer program product of claim 7, wherein the component metadata further includes one or more of the following custom component author information and developer information.

9. The computer program product of claim 7, wherein the custom component is generated based on code or script present in the production webpage.

10. The computer program product of claim 9, wherein the custom component is determined to be present in the production webpage based on a package manifest associated with the production webpage.

11. The computer program product of claim 7, wherein a web browser viewing the production webpage is capable of natively toggling the hidden element without a plug-in or extension.

12. The computer program product of claim 7, wherein the event that makes the hidden element visible includes one of the following events: a mouseover event with the hidden element, a hover event with the hidden element, a click event with the hidden element, or a click event associated with a button rendered on the production webpage.

13. A computer system comprising:
    one or more computer processors;
    one or more computer readable storage media; and
    program instructions stored on the computer readable storage media for execution by at least one of the one or more processors, the program instructions comprising:
    program instructions to retrieve a production webpage;
    program instructions to determine a custom component of the production webpage;
    program instructions to generate a hidden element in the production webpage including the component metadata, wherein the hidden element and the component metadata is initially not visible when viewing the production webpage, and an indication for the hidden element and the component metadata is not present;
    program instructions to add a hidden border style to the hidden element of the production webpage, wherein the production webpage is configured to make the hidden element visible in response to the event; and
    program instructions, in response to an event, to display the hidden element and the component metadata, wherein the component metadata includes a custom component name, a version number, a description of the custom component, a repository location for the custom component, and a list of dependencies for the custom component to other custom components on the webpage.

14. The computer system of claim 13, wherein the component metadata further includes one or more of the following custom component author information and developer information.

15. The computer system of claim 13, wherein the custom component is generated based on code or script present in the production webpage.

16. The computer system of claim 15, wherein the custom component is determined to be present in the production webpage based on a package manifest associated with the production webpage.

17. The computer system of claim 13, wherein a web browser viewing the production webpage is capable of natively toggling the hidden element without a plug-in or extension.

* * * * *